US012695934B2

(12) United States Patent
Ramanayaka

(10) Patent No.: US 12,695,934 B2
(45) Date of Patent: Jul. 28, 2026

(54) REAL-TIME COMMUNICATION VIDEO COMPILATION

(71) Applicant: Vidura Ramanayaka, Melbourne (AU)

(72) Inventor: Vidura Ramanayaka, Melbourne (AU)

( * ) Notice: Subject to any disclaimer, the term of this patent is extended or adjusted under 35 U.S.C. 154(b) by 0 days.

(21) Appl. No.: 18/822,812

(22) Filed: Sep. 3, 2024

(65) Prior Publication Data

US 2025/0080789 A1 Mar. 6, 2025

(30) Foreign Application Priority Data

Sep. 4, 2023 (AU) ................................. 2023902848

(51) Int. Cl.
*H04N 21/2743* (2011.01)
*H04N 21/643* (2011.01)

(52) U.S. Cl.
CPC ....... *H04N 21/2743* (2013.01); *H04N 21/643* (2013.01)

(58) Field of Classification Search
CPC ............. H04N 21/2743; H04N 21/643; H04N 21/4223; H04N 21/4788; H04N 21/472; H04N 21/632; H04N 7/14; H04N 21/47; H04N 7/15; G09B 5/06; G11B 27/102; G11B 27/34; G06F 3/1454; H04L 12/1813; H04L 65/1108; H04L 65/65; H04M 3/563; H04M 3/567
See application file for complete search history.

(56) References Cited

U.S. PATENT DOCUMENTS

| | | | |
|---|---|---|---|
| 11,533,354 B1 * | 12/2022 | Fieldman | H04L 65/65 |
| 2004/0114541 A1 * | 6/2004 | Caspi | H04L 65/1101 |
| | | | 709/204 |
| 2017/0094189 A1 * | 3/2017 | Ogawa | H04N 23/667 |
| 2019/0110025 A1 * | 4/2019 | Yamaguchi | H04N 9/8205 |
| 2019/0394425 A1 * | 12/2019 | Segal | H04N 21/4782 |
| 2022/0408157 A1 * | 12/2022 | Siddique | H04L 65/611 |
| 2024/0340323 A1 * | 10/2024 | Kaestner | H04N 5/265 |

* cited by examiner

*Primary Examiner* — Farzana B Huq
(74) *Attorney, Agent, or Firm* — INNOVATION CAPITAL LAW GROUP, LLP; Vic Lin

(57) ABSTRACT

A real-time communication video compilation system is disclosed, which facilitates the recording and sharing of video content within digital communication platforms. The system comprises an electronic device equipped with a camera and a screen, in communication with a server. The device runs an application that interacts with a Real-Time Communication (RTC) protocol API, enabling the display of a video recording controller. This controller allows users to record video from the camera, the screen, or both, with the option to overlay camera feeds on the screen during recording. The recorded video data is then uploaded to the server for integration into communication timelines, enhancing interactive communication by allowing seamless creation and sharing of media-rich content directly within the communication environment.

20 Claims, 9 Drawing Sheets

REAL-TIME COMMUNICATION VIDEO COMPILATION

FIELD OF THE INVENTION

This invention relates to a real-time communication video compilation system which streamlines the creation and integration of media-rich content into digital communications by enabling recording and sharing of screen content and camera feeds via the Real-Time Communication (RTC) Application Programming Interface (API).

BACKGROUND OF THE INVENTION

The reliance on communication platforms has seen a significant surge in the past decade, largely attributed to the growing prevalence of virtual learning. Within the realm of virtual education, communication platforms play a pivotal role in enabling both asynchronous and synchronous interactions between educators and students.

The role of communication platforms has particularly evolved in synchronous communication through advancements in video calling technology. Educational institutions employ video calling to conduct live-streamed classes and facilitate online consultations, fostering direct engagement between educators and students. These interactions necessitate the sharing of participants' digital and physical environments. Broadcasting a participant's device screen offers a dynamic showcase of software processes, contributing significantly to an immersive and collaborative learning environment.

Furthermore, the capability to share a participant's physical surroundings empowers them to utilise various physical tools in real time through their device cameras. This broadens the spectrum of available teaching aids, encompassing tools like whiteboards, projectors, and even live demonstrations of handwritten work. Asynchronous communication, on the other hand, primarily involves messaging through email, chats, or forums, allowing participants to respond at their convenience rather than in real time.

In the context of virtual learning, asynchronous communication becomes vital when interactions occur outside of live classes. Such scenarios often entail the exchange of physical and digital content. Although current communication platforms offer the option to create videos using device cameras, this approach falls short, capturing only the user's physical surroundings. A substantial enhancement in communication between educators and students, benefiting not only virtual learners but all asynchronous messaging users, can be achieved if both the physical and digital aspects of a participant's space can be independently and simultaneously captured.

SUMMARY OF THE DISCLOSURE

There is provided herein a real-time communication video compilation system which facilitates real-time communication video compilation using a server and an electronic device equipped with processing and memory capabilities.

The server hosts data, which may be in the form of web pages, which includes a real-time communication (RTC) component for executing RTC functionalities, preferably browser-based WebRTC functionalities.

This setup allows for the recording and storage of video files for use in a communication platform, possibly represented as a chat timeline or forum.

The process involves fetching the data from the server, which interact with the RTC protocol to access multimedia devices for recording. The user interface may allow for selection between different recording options, including the choice of camera feeds to overlay on the screen during recording. The system can stream media using the RTC API and record the entire screen, including any superimposed camera feeds, into video files. These files are then transmitted to the server for storage and can be integrated into a communication timeline, making them accessible for playback.

The present system's configuration inherently supports the convenient recording of video files for media-rich integration into real-time communications, like chat timelines or forums.

By utilising the WEBReal-Time Communication (RTC) API according to a preferred embodiment, the present system allows for the seamless capture and streaming of video directly within web browser applications which negates the need for external recording tools or software, streamlining the process for users to generate and share content in real-time.

Also, the ability to record the entire screen along with superimposed camera feeds enables a more dynamic and interactive form of communication. This feature is particularly beneficial for social interactions within chat timelines or forums, where visual cues and demonstrations can significantly enhance understanding and engagement.

Moreover, the system's capability to directly convert these recordings into video files for immediate integration into communication platforms simplifies the content sharing process. Users can record, upload, and share their videos without leaving the communication environment, making for a seamless user experience. This direct integration fosters a more interactive and engaging community experience, as participants can easily access, view, and respond to video content within the same platform.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
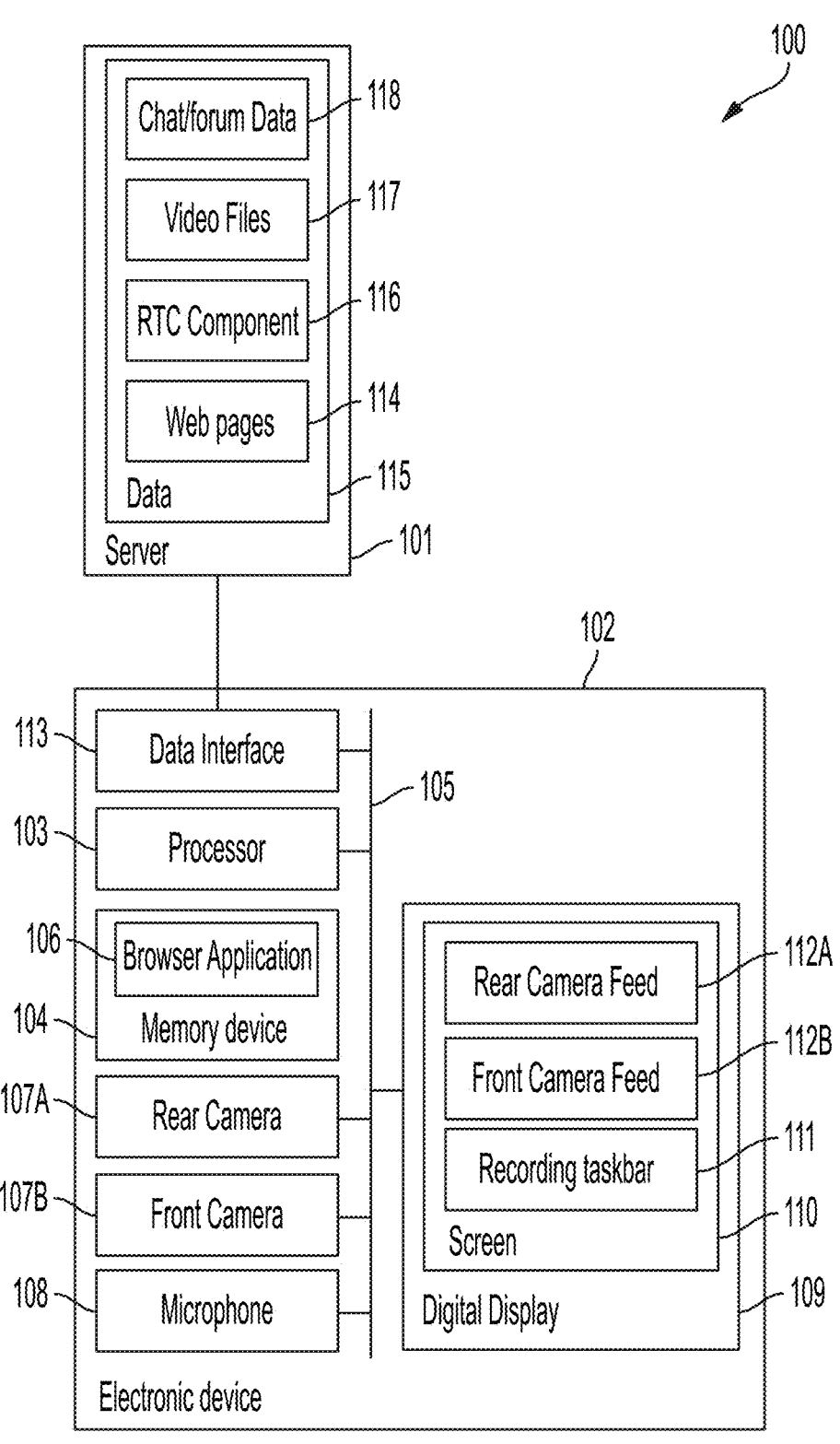
FIG. 1 shows a real-time communication video compilation system in accordance with an embodiment.

FIG. 1 shows a real-time communication video compilation system 100 comprising a server 101 in operable communication with an electronic device 102. The electronic device 102 comprises a processor 103 for processing digital data. The electronic device 102 further comprises a memory device 104 in operable communication with the processor 103 via a system bus 105. The memory device 104 is configured for storing digital data, including computer program code instructions. These computer program code instructions are fetched, decoded, and executed by the processor 103 to implement the computer functionality described herein.

The memory device 104 may comprise a plurality of software applications that are executed by the processor 103, including an application 106. In a preferred embodiment, the application 106 is a browser application 106.

The electronic device 102 may comprise at least one camera 107. In the embodiment shown, the electronic device 102 comprises a rear camera 107A and a front camera 107B. The electronic device 102 may further comprise a microphone 108. The electronic device 102 further comprises a digital display 109 configured to display a screen 110. As will be described in further detail below, the electronic device 102 interacts with the server 101 to display a recording taskbar 111 for the recording of video. The screen 110 may further comprise camera feeds 112 superimposed thereon.

The electronic device 102 may further comprise a data interface 113 for sending and receiving data across a wide area network, such as the Internet, which is used for communication with the server 101. The server 101 may similarly comprise the aforementioned processor 103, memory device 104, and data interface 113.

The server 101 maintains data 115. In a preferred embodiment, the data 115 includes web pages 114, and the server 101 executes a web server application configured to serve the web pages 114 to the browser application 106. These web pages comprise HTML, CSS, and client-side code (typically in the form of JavaScript).

The server 101 may further store a real-time communication (RTC) component 116, which comprises client-side code executed by the application 106. The RTC component 116 may be WebRTC components when the application 106 is a browser application.

The server 101 may further store video files 117 recorded by the electronic device 102. The server 101 may also store communication data 118 in the form of a chat timeline or forum.

Figure 9:
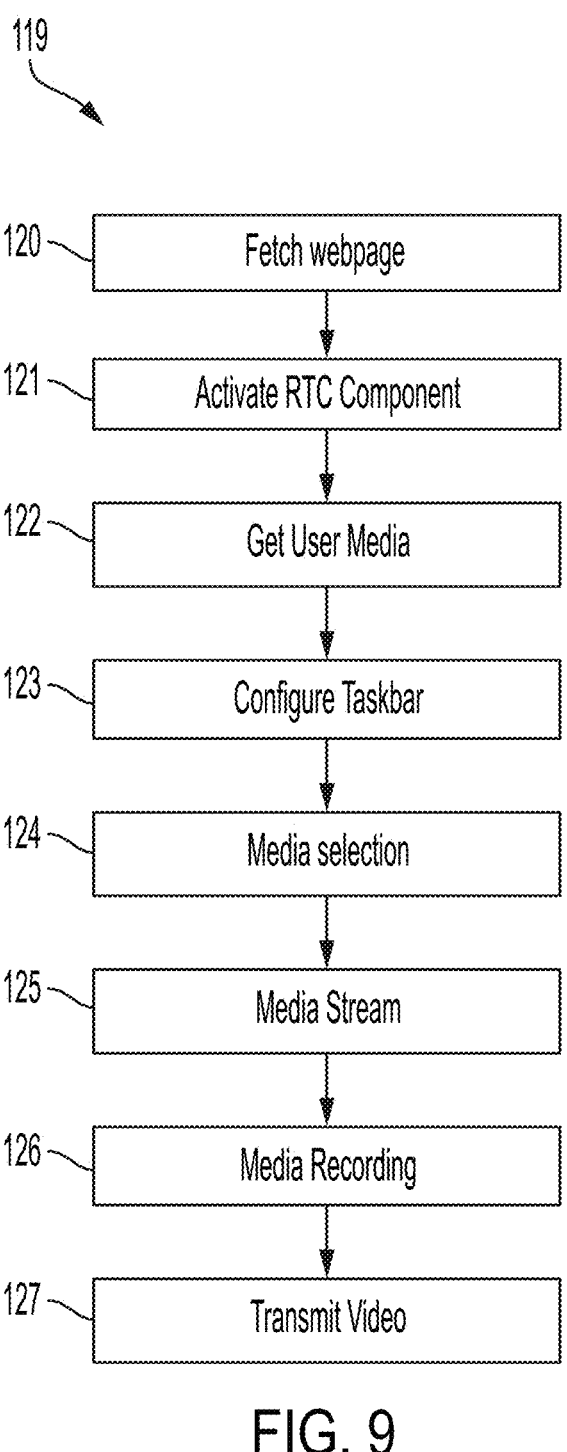
FIG. 9 shows exemplary processing by the system.

FIG. 9 shows exemplary processing 119 by the system 100 in accordance with the preferred embodiment wherein the application 106 is a browser application. However, it should be appreciated that the application 106 may take forms other than browser applications, including desktop and mobile applications.

At step 120, the browser application 106 fetches a web page 114 from the server 101. The web page 114 comprises client-side code configured to interact with an RTC protocol API, such as WebRTC (Web Real-Time Communication) technology. WebRTC enables real-time communication, such as audio, video, and data sharing, directly between web browsers and mobile applications.

Figure 7:
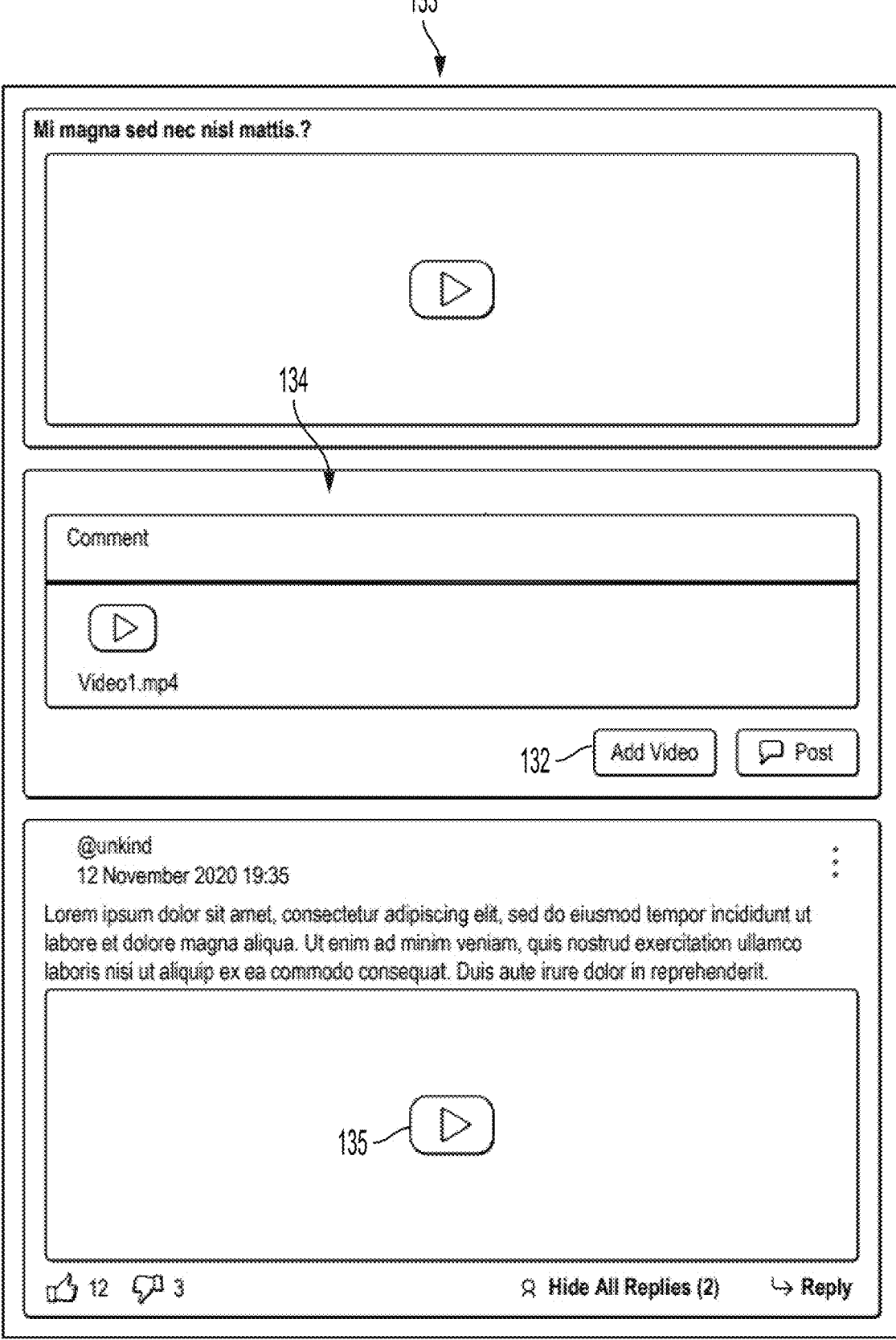
FIG. 7 shows a communication timeline having a reply field having a video recording option.
Figure 8:
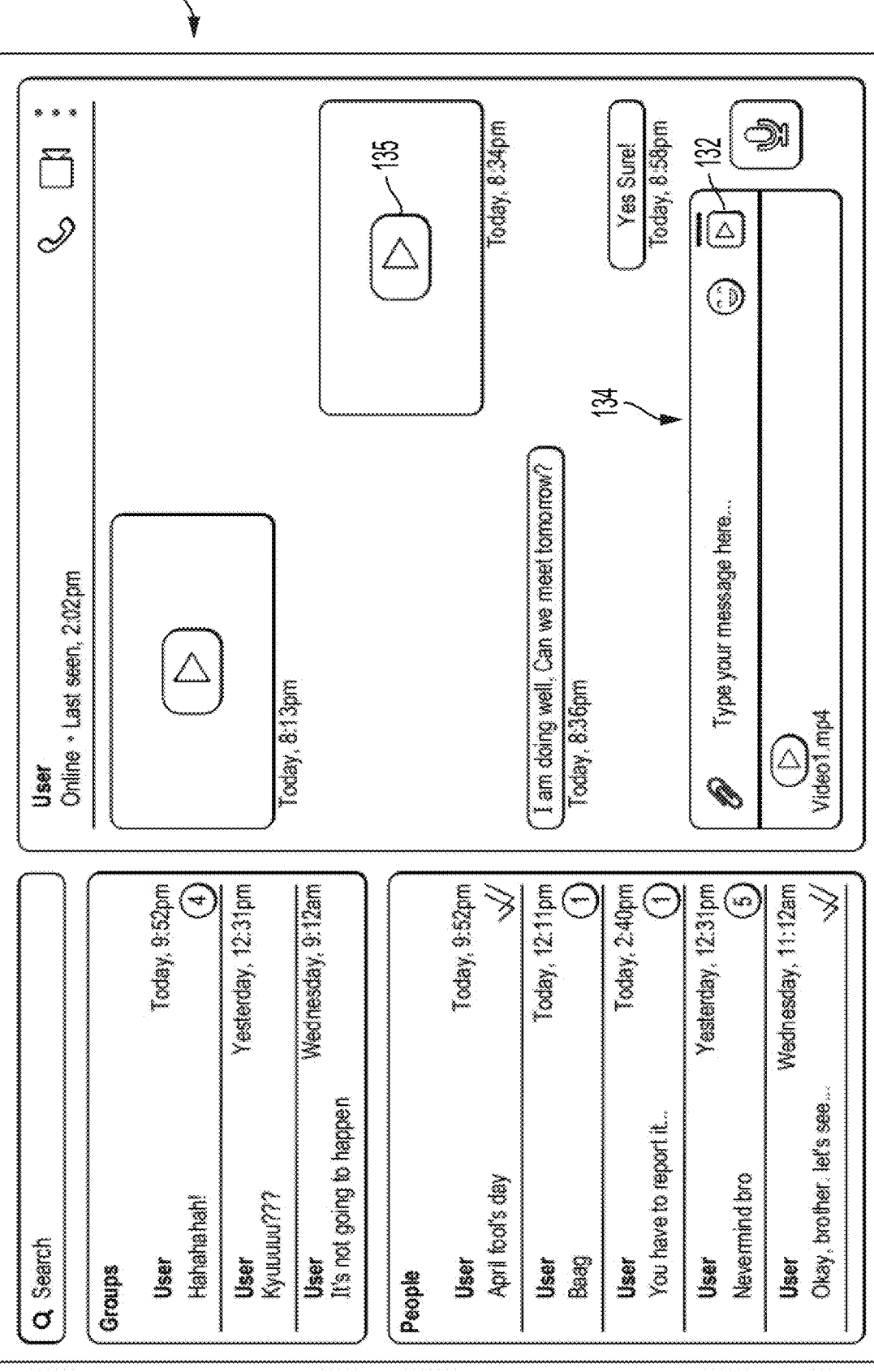
FIG. 8 shows a further communication timeline having a video recording option.

FIG. 8 shows a user interface comprising a communication timeline 133 having a plurality of communications in chronological order. The user interface includes a reply field 134, which may comprise a video recording option 132 in the form of an icon that is selectable to record a video response, as opposed to a text response. FIG. 7 shows a further embodiment of the communication timeline 133 having a reply field 134 with a video reply option in the form of a button.

The web page 114 may be served with an RTC component 116, which is activated by selecting the video recording option 132 at step 121. The video recording option 132 may be embedded in web pages 114 served by third-party web servers which, when executed by the browser application 106, retrieve the RTC component 116 from the server 101.

At step 122, the client-side code may interact with the RTC API exposed by the browser application 106 to gain access to the multimedia devices of the electronic device 102, including the screen 110 and the cameras 107.

In embodiments, the electronic device 102 may only comprise one camera 107, such as a webcam. However, where the electronic device 102 takes the form of a mobile communication device, the electronic device 102 may have an inbuilt front camera 107B and a rear camera 107A.

Figure 2:
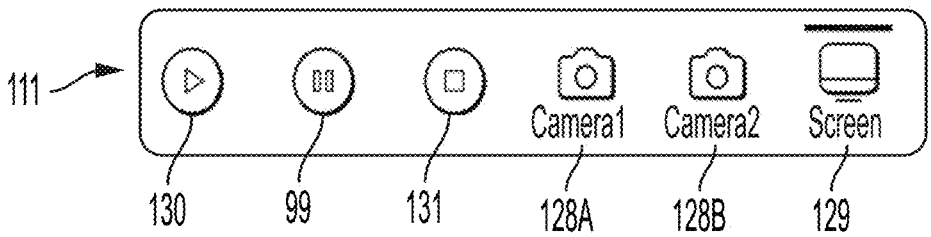
FIG. 2 shows a video recording controller.
Figure 3:
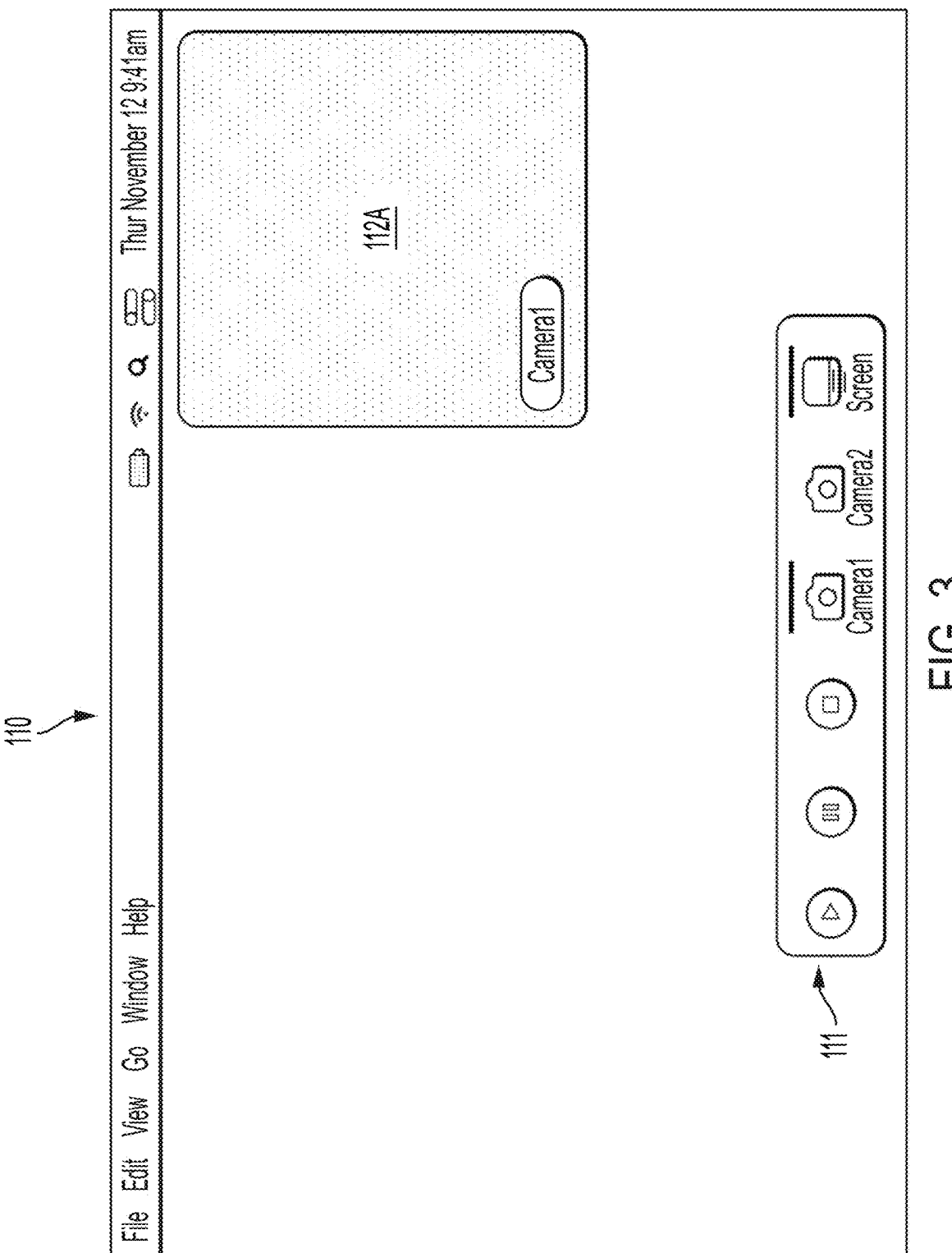
FIG. 3 shows a screen having a single video feed superimposed thereon.
Figure 4:
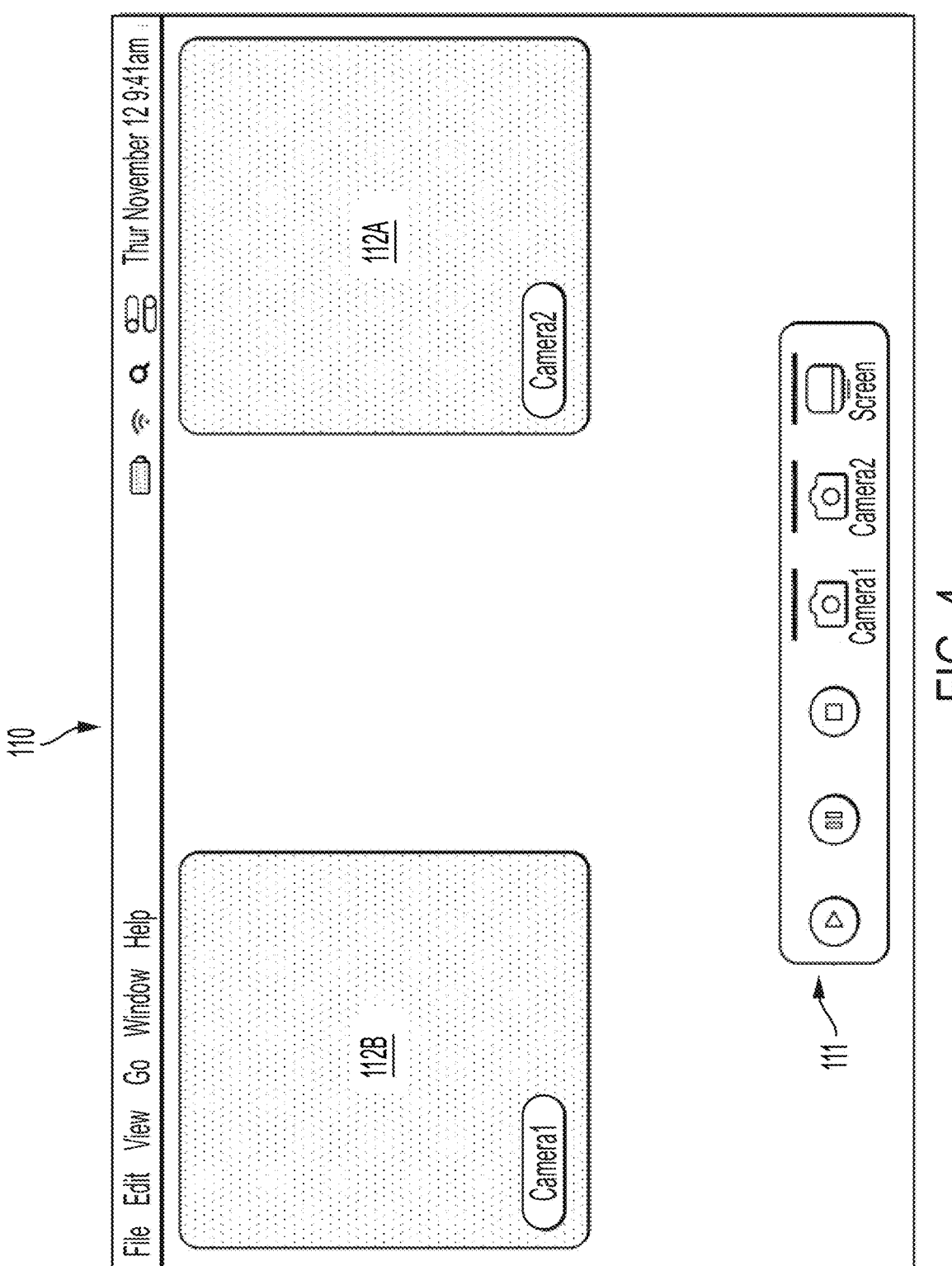
FIG. 4 shows a screen having dual video feeds superimposed thereon.

FIG. 2 shows the taskbar 111 in accordance with an embodiment. The taskbar 111 may have controls 128 to record video from each or both cameras 107. The taskbar 111 may further include a control 129 to record video from the screen 110.

Depending on the response from the API at step 122, the client-side code may configure the taskbar 111 accordingly at step 123. For example, if only a front camera is available, the control 128B to record video from the rear camera 107A may be disabled or not displayed.

At step 124, the user makes a selection as to which media to record. For example, selecting the screen recording control 129 and the front camera control 128A would cause the client-side code to display the front camera feed 112B superimposed on the screen 110. Selecting both screen recording controls 128A and 128B would cause the client-side code to display both the front camera feed 112B and the rear camera feed 112A simultaneously on the screen 110.

As is evident from FIG. 2, activation of a control may be indicated in the taskbar 111. For example, the activation of the screen recording control 129 may be indicated by the superimposition of a bar above it.

Figure 5:
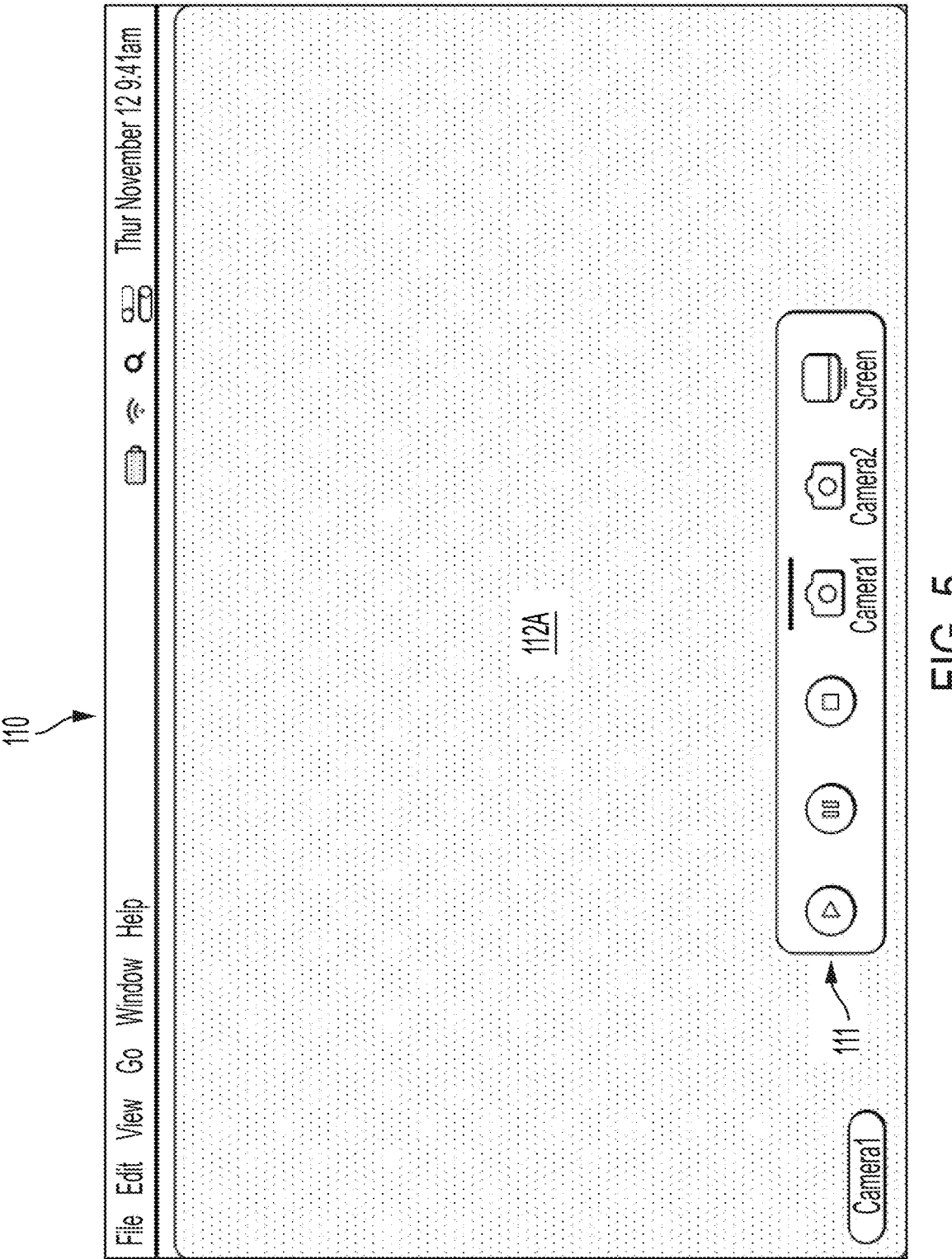
FIG. 5 shows a screen having a single video feed maximised therein.
Figure 6:
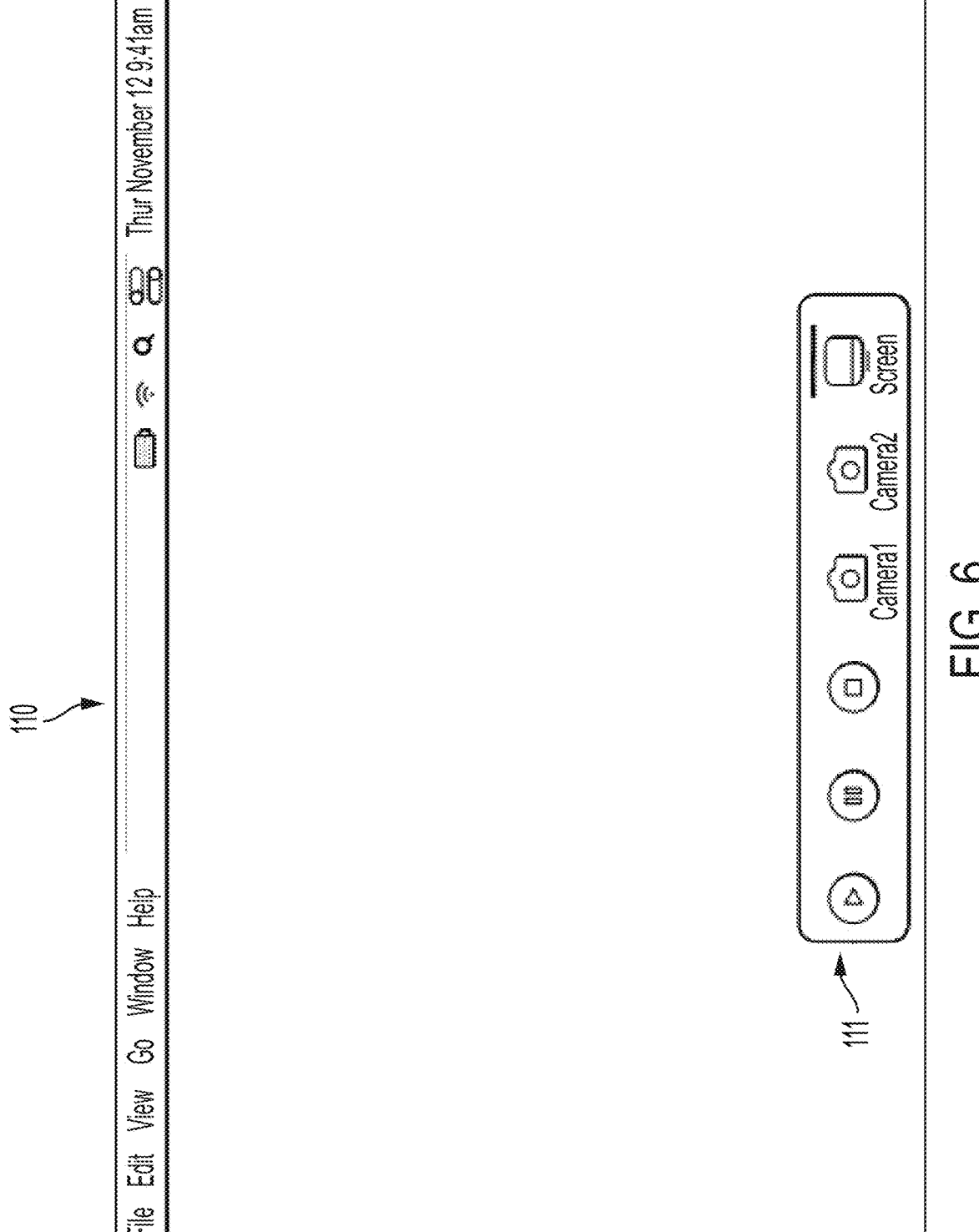
FIG. 6 shows a screen having no video feeds superimposed thereon.

FIG. 5 shows an embodiment wherein only one of the camera controls 128 is selected, and the client-side code maximises the corresponding video feed 112 within the screen 110. FIG. 6 shows an embodiment where neither camera feed 112 is selected, and only the screen recording control 129 is selected, resulting in no video feed 112 overlay being displayed.

Depending on the configuration of the controls 128 and 129, the client-side code would stream media using the RTC API at step 125. Media streamed from the cameras 107 would be displayed within the respective camera feeds 112 superimposed on the screen 110.

At step 126, the client-side code interacts with the Media Recorder API of the WebRTC framework to enable the browser application 106 to record video of the entire screen 110, which can be streamed into Blob objects or MediaRecorder chunks to the server 101. In this way, the browser application 106 records video data of the entire screen 110, including the camera feeds 112 superimposed thereon.

The taskbar 111 may have a recording control 130 that causes the client-side code to commence recording video and a stop control 131 to cease recording. The client-side code then generates a video file which is transmitted or streamed to the server 101 at step 127 for storage. The server 101 may then include a playable video communication 135 within the communication timeline 133, which, when selected, plays the video.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A real-time communication video compilation system comprising:
an electronic device in operable communication with a server; and
at least one camera and a screen as components of the electronic device,
wherein the electronic device executes a communication platform configured to fetch data from the server, the data comprising code disposed on a computer readable storage medium, the code executable by a processor of the electronic device to cause the electronic device to interact with a real-time communication (RTC) protocol API within the communication platform to:
display a video recording controller having controls to record video from at least one of the at least one camera and the screen;
in response to operation of the controls to record video from the at least one camera, display an onscreen camera feed;
record video data of content of the screen, including the onscreen camera feed; and
upload the video data to the server, wherein:
the RTC protocol API is operable to create and deliver the video data to the communication platform without leaving the communication platform; and
the communication platform includes a visible icon to execute the RTC protocol API.

2. The system as claimed in claim 1, wherein the data fetched from the server comprises web page data and wherein the application is a web browser application.

3. The system as claimed in claim 1, wherein the electronic device comprises a front camera and a rear camera, and wherein the video recording controller has controls to record video from both the front camera and the rear camera, and wherein, in response to operation of the controls to record video from both cameras simultaneously, the code is configured to display dual camera feeds simultaneously superimposed within the screen.

4. The system as claimed in claim 1, wherein, in response to operation of the controls to record video from only one camera, the code is configured to expand the corresponding camera feed to occupy most of the screen.

5. The system as claimed in claim 1, wherein the video recording controller comprises a recording control configured to commence recording of the video data and a stop control configured to cease recording of the video data.

6. The system as claimed in claim 1, wherein the code is configured to interact with the RTC protocol to detect media of the electronic device and to control the controls of the video recording controller accordingly.

7. The system as claimed in claim 1, wherein the web page comprises a video recording option selectable to initiate recording video data of the screen.

8. The system as claimed in claim 6, wherein the RTC component is embedded within the web page and is activated by selection of the visible icon.

9. The system as claimed in claim 1, wherein the data comprises a communication timeline and wherein the video is inserted as a playable video communication within the timeline.

10. A real-time communication video compilation system comprising:
an electronic device in operable communication with a server; and
at least one camera and a screen as components of the electronic device,
wherein the electronic device executes a communication platform configured to fetch data from the server, the data comprising code disposed on a computer readable storage medium, the code executable by a processor of the electronic device to cause the electronic device to interact with a real-time communication (RTC) protocol API within the communication platform to:
display a video recording controller having controls to record video from at least one of the at least one camera and the screen;
in response to operation of the controls to record video from the at least one camera, display an onscreen camera feed;
record video data of an entirety of the screen, including the onscreen camera feed; and
upload the video data to the server, wherein:
the RTC protocol API is operable to create and deliver the video data to the communication platform without leaving the communication platform; and
the communication platform includes a visible icon to execute the RTC protocol API.

11. The system as claimed in claim 10, wherein the data fetched from the server comprises web page data and wherein the application is a web browser application.

12. The system as claimed in claim 10, wherein the electronic device comprises a front camera and a rear camera, and wherein the video recording controller has controls to record video from both the front camera and the rear camera, and wherein, in response to operation of the controls to record video from both cameras simultaneously, the code is configured to display dual camera feeds simultaneously superimposed within the screen.

13. The system as claimed in claim 10, wherein, in response to operation of the controls to record video from only one camera, the code is configured to expand the corresponding camera feed to occupy most of the screen.

14. The system as claimed in claim 10, wherein the video recording controller comprises a recording control configured to commence recording of the video data and a stop control configured to cease recording of the video data.

15. The system as claimed in claim 10, wherein the code is configured to interact with the RTC protocol to detect media of the electronic device and to control the controls of the video recording controller accordingly.

16. The system as claimed in claim 10, wherein the web page comprises a video recording option selectable to initiate recording video data of the screen.

17. The system as claimed in claim 15, wherein the RTC component is embedded within the web page and is activated by selection of the visual icon.

18. The system as claimed in claim 10, wherein the data comprises a communication timeline and wherein the video is inserted as a playable video communication within the timeline.

19. The system as claimed in claim 1, wherein the communications platform is operable as a synchronous communications platform and as an asynchronous communications platform.

20. The system as claimed in claim 10, wherein the communications platform is operable as a synchronous communications platform and as an asynchronous communications platform.

* * * * *